R. J. & H. E. ALTGELT.
PLANTING MACHINE.
APPLICATION FILED MAY 7, 1910.
1,024,662.
Patented Apr. 30, 1912.
3 SHEETS—SHEET 2.
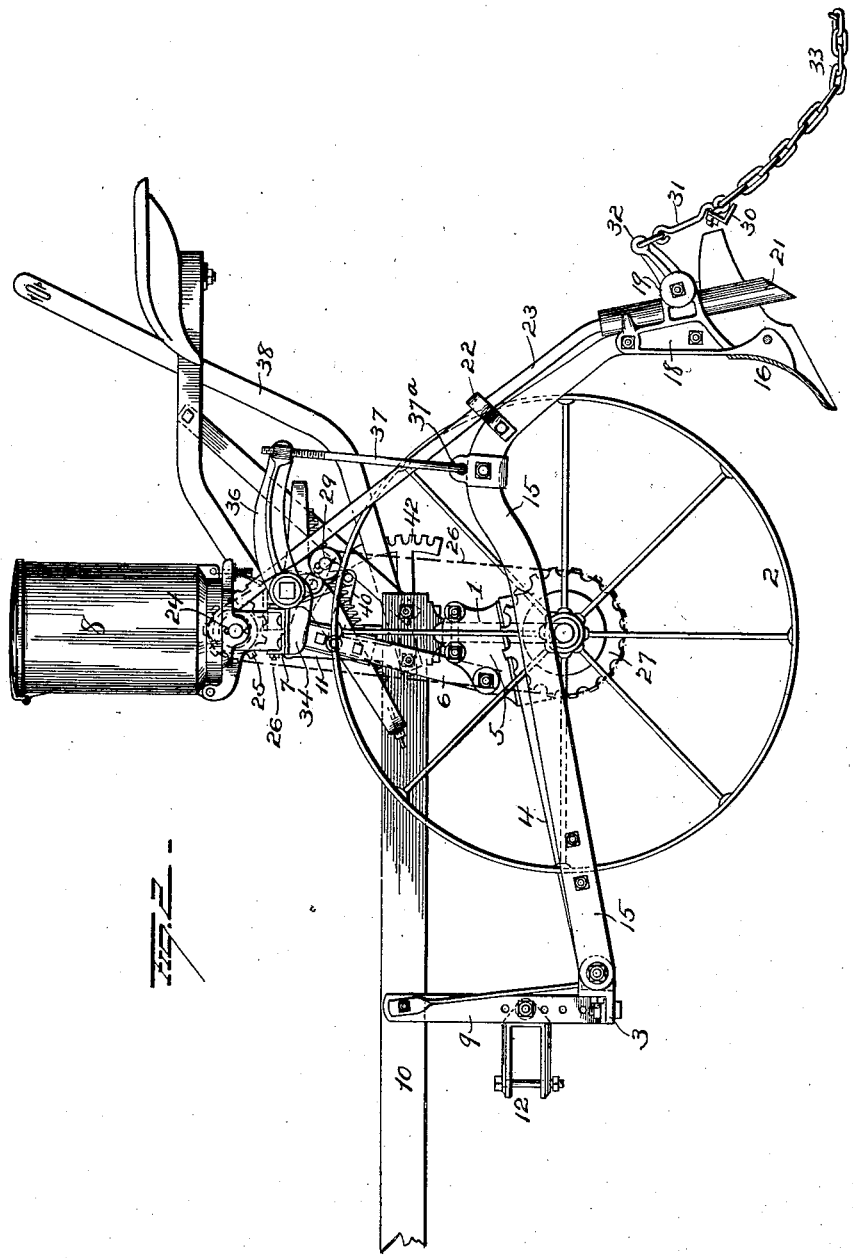
WITNESSES
INVENTORS

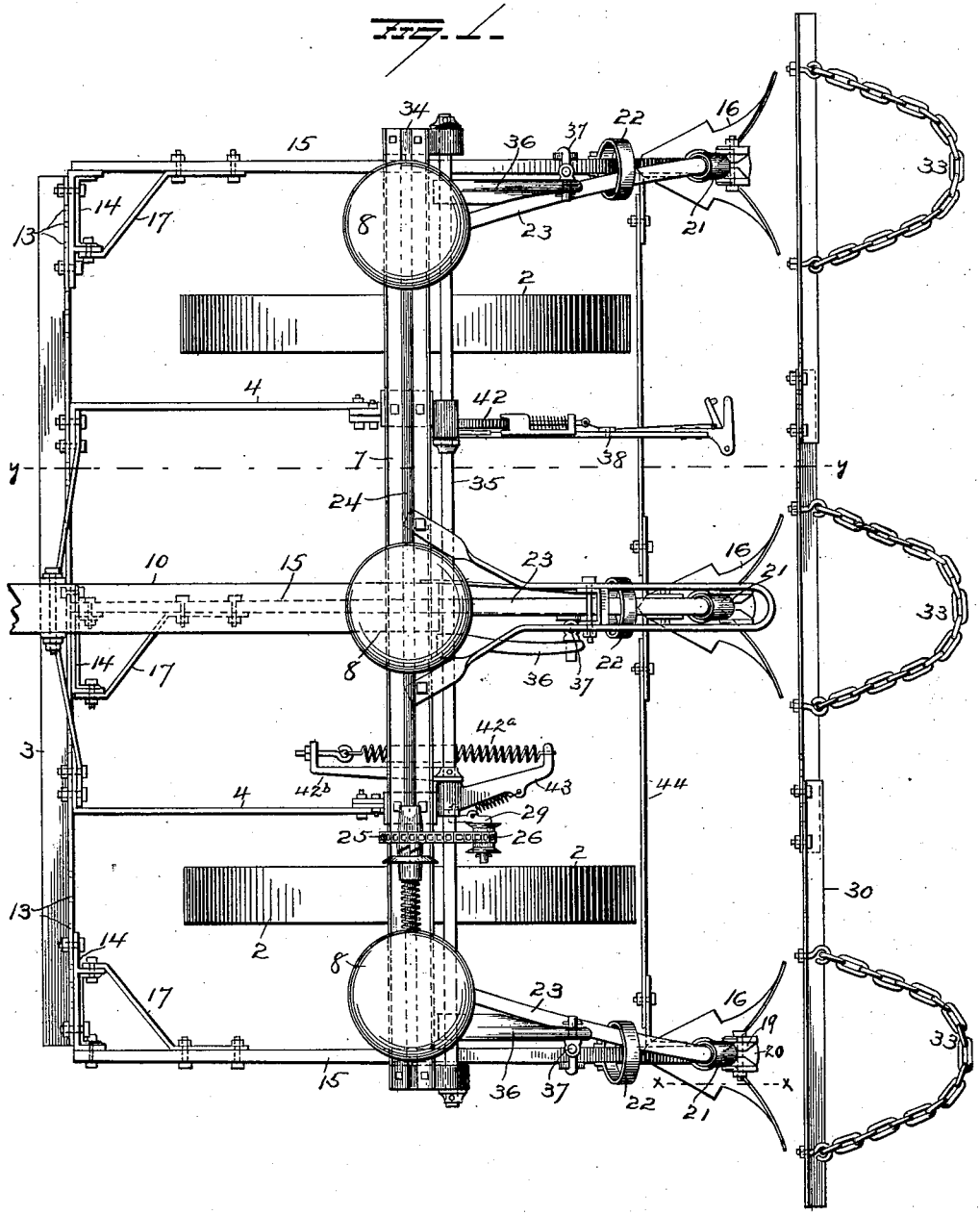

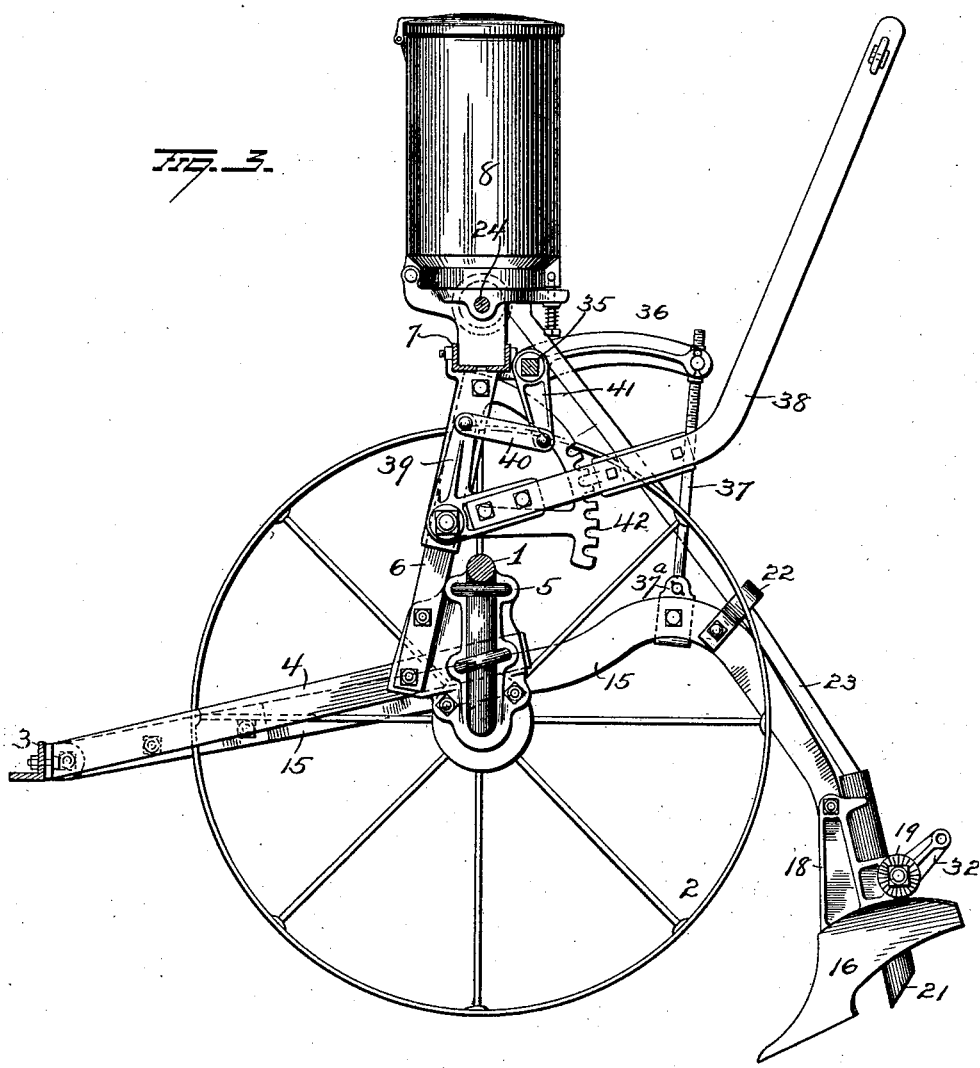

UNITED STATES PATENT OFFICE.

RUDOLPH JOSEPH ALTGELT AND HERMAN ERNEST ALTGELT, OF SOUTH BEND, INDIANA, ASSIGNORS TO OLIVER CHILLED PLOW WORKS, OF SOUTH BEND, INDIANA.

PLANTING-MACHINE.

1,024,662.  Specification of Letters Patent.  Patented Apr. 30, 1912.

Application filed May 7, 1910. Serial No. 559,944.

*To all whom it may concern:*

Be it known that we, RUDOLPH J. ALTGELT and HERMAN E. ALTGELT, of South Bend, in the county of St. Joseph and State of Indiana, have invented certain new and useful Improvements in Planting-Machines; and we do hereby declare the following to be a full, clear, and exact description of the invention, such as will enable others skilled in the art to which it appertains to make and use the same.

This invention relates to improvements in planting machines,—the object of the invention being to provide a structure which can readily be adjusted for planting in rows different distances apart; which can be easily manipulated, and which shall be of comparatively light draft.

A further object is to provide an adjustable planting machine with chain coverers which can be adjusted in accordance with the adjustment of the furrow openers.

With these objects in view the invention consists in certain novel features of construction and combinations of parts as hereinafter set forth and pointed out in the claims.

In the accompanying drawings, Figure 1 is a plan view: Fig. 2 is a side elevation, partly in section on the line $x$—$x$ of Fig. 1, and Fig. 3 is a section on the line $y$—$y$ of Fig. 1.

1 represents an arch axle having its respective ends mounted in the hubs of carrying wheels 2. In front of the carrying wheels, the horizontal cross-beam 3 of a rigid frame is located and this cross-beam is connected by means of bars 4 with bracket 5 secured to the vertical members of the crank-axle 1. Standards 6 are secured at their lower ends to the brackets 5 and upon the upper ends of these standards, a horizontal channel beam 7 is secured. This channel-beam supports a series of seed hoppers 8 and feeding mechanism therefor. The front transverse beam of the rigid framework has secured to the central portion thereof, the lower ends of two standards 9, the latter being spaced apart and secured at their upper ends to a tongue 10. The rear end of the tongue 10 terminates approximately over the crank axle and is connected with the channel beam 7 by means of a rigid arm or prop 11. The parallel standards 9 are made, each with a series of perforations to permit the adjustable attachment of a clevis 12.

The front horizontal beam 3 is made angular in cross-section and its upright member is provided with numerous perforations 13 for the accommodation of bolts by means of which brackets 14 are secured to said cross-beam. The brackets 14 adjacent to the ends of the cross-beam can be adjusted laterally with relation to the latter for the purpose of permitting lateral adjustment of the beams 15 of furrow openers 16, so that the machine can be adjusted for planting in rows different distances apart. The forward end of each beam 15 is pivotally attached to one of the brackets 14 and each beam is provided with a lateral brace 17 which is also pivotally attached to the same bracket 14. Each furrow opener 16 is secured to a standard 18 which is bifurcated to receive the depending rear end of a beam 15,—suitable securing devices being employed to rigidly fasten the standard and beam together. Each standard 18 is provided with a sleeve 19 and a collar or clip 20 which serve to hold in place, a boot 21 disposed behind the depending portion of the beams 15 and the furrow opener carried by this beam. Each beam 15 is provided adjacent to the upper end of its depending portion, with a loop 22 through which a seed tube passes,—the lower end of said seed tube 23 23 entering the boot 21 and the upper end communicating with the feed mechanism of one of the hoppers 8.

The feed mechanism above referred to and which may be of any approved construction, is operated from a shaft 24 and the latter is provided with a sprocket wheel 25 receiving motion from a sprocket chain 26 and the latter is driven by a sprocket wheel 27 rotatable with one of the carrying wheels. The sprocket chain 26 is maintained taut by means of a roller carried by a spring pressed arm 29.

Located behind the furrow openers and having a length appreciably greater than the width of the machine, is a horizontal angle beam 30 comprising several sections adjustably secured together. The sectional angle beam 30 is supported by means of links 31 attached to the rear ends of arms 32 adjustably attached to the sleeves 19. Each section of the angle beam 30 has secured thereto, the respective ends of a chain coverer 33 so disposed as to travel immediately behind the adjacent furrow opener and seed discharging boot. By adjusting the arms 32 the angle beam 30 and the forward ends of the chain coverers can be adjusted vertically and by making the angle beam 30 in sections which are adjustable longitudinally with respect to each other, the chain coverers can be adjusted in accordance with the adjustment of the furrow opener and planting devices for planting in rows different distances apart.

Brackets 34 are secured to the channel beam 7 and afford bearings for a rock-shaft 35 having rearwardly projecting arms 36. To the rear ends of the arms 36, the upper ends of rods 37 are adjustably connected and the lower ends of these rods are pivotally attached to lugs 37$^a$ on the beams 15. To one of the standards 6, an operating lever 38 is pivotally attached and provided with an arm 39 connected by means of a link 40 with an arm 41 depending from the rock-shaft 35. This lever is provided with a suitable manually operated latch to engage the teeth of a segment 42 which may also be secured to the said standard 6. By depressing the operating lever 38, the rock-shaft 35 will be turned in a direction to elevate the arms 36 and raise all of the beams 15 simultaneously. Thus it will be seen that by manipulating the lever 38 all of the furrow openers and seed discharging devices coöperating therewith can be raised or lowered simultaneously. In order to assist in raising the beams 15 and attached parts, a spring 42$^a$ may be connected at one end with an arm 42$^b$ projecting from the rock-shaft 35 and at the other end with an arm 43 secured to the framework. The beams 15 at respective ends of the machine are connected with the center beam 15 by means of longitudinally adjustable braces 44,—the connection of these braces with the beams being above the attachment of the furrow opener standards with the lower end of said beam.

Various changes might be made in the details of construction of our invention without departing from the spirit thereof or limiting its scope and hence we do not wish to restrict ourselves to the precise details herein set forth.

Having fully described our invention what we claim as new and desire to secure by Letters-Patent, is,—

1. The combination with carrying wheels, an axle and a tongue, of a fixed frame supported by the axle and the tongue, an upper horizontal beam disposed above the axle and frame and supported thereby, furrow opener beams pivotally connected at their forward ends with the forward portion of said frame, supporting means for the rear portions of the furrow opener beams, mounted on said upper horizontal beam, grain hoppers supported on said horizontal beam, furrow openers at the rear ends of the furrow opener beams, and conveying means communicating with said grain hoppers and discharging behind the furrow openers.

2. The combination with a rigid frame and carrying wheels, of a series of furrow opener beams, furrow openers carried by the rear ends of said beams, seed discharging devices, a cross beam supported by the rear ends of said furrow opener beams and chain coverers attached to said cross-beam.

3. The combination with a rigid frame and carrying wheels, of a series of furrow opener beams attached at their forward ends to said rigid frame, furrow openers carried by rear ends of said beams, a transverse beam comprising longitudinally adjustable sections supported by the furrow opener beams, and chain coverers attached to the sections of said transverse beam.

4. The combination with a rigid frame and carrying wheels, of a series of furrow opener beams, furrow openers at the rear ends of said beams, means adjustably and pivotally connecting two of said beams with the forward portion of the rigid frame, a series of chain coverers, means for adjusting said chain coverers laterally, and means for discharging seed behind the furrow openers and in front of said chain coverers.

5. The combination with a rigid frame and carrying wheels, of a beam attached at its forward end to the frame, a furrow opener, a standard connecting the furrow opener with the rear end of the beam, a vertically adjustable arm projecting from said standard, a transverse beam in rear of the furrow opener and connected with said adjustable arm, a chain coverer attached to said transverse beam, and seed discharging means.

In testimony whereof, we have signed this specification in the presence of two subscribing witnesses.

RUDOLPH JOSEPH ALTGELT.
HERMAN ERNEST ALTGELT.

Witnesses:
ALFRED MOAG,
FRANK G. DRESSEL.